United States Patent [19]
Malm et al.

[11] Patent Number: 6,017,989
[45] Date of Patent: Jan. 25, 2000

[54] EXTERIOR AUTOMOTIVE COMPONENT OF AN ELASTOMERIC MODIFIED POLYOLEFIN MATERIAL HAVING PLEASING APPEARANCE

[75] Inventors: Douglas N. Malm, Northville; David F. Mehl, Auburn Hills; Kris W. Winowiecki, Brighton; Salim M. Sheriff, Canton, all of Mich.

[73] Assignee: The Standard Products Company, Cleveland, Ohio

[21] Appl. No.: 08/831,148

[22] Filed: Apr. 1, 1997

[51] Int. Cl.[7] .................................................. C09D 5/29
[52] U.S. Cl. ........................ 524/440; 523/171; 524/401; 524/439; 524/441
[58] Field of Search .................................. 524/401, 439, 524/440, 441; 523/171

[56] References Cited

U.S. PATENT DOCUMENTS

| | | |
|---|---|---|
| 3,850,474 | 11/1974 | Welch . |
| 4,268,552 | 5/1981 | Duvdevani et al. . |
| 4,323,534 | 4/1982 | DesMarais . |
| 4,355,425 | 10/1982 | Jones et al. . |
| 4,369,284 | 1/1983 | Chen . |
| 4,600,736 | 7/1986 | Needham . |
| 4,604,421 | 8/1986 | Mitsuno et al. . |
| 4,618,213 | 10/1986 | Chen . |
| 4,663,220 | 5/1987 | Wisneski et al. . |
| 4,720,514 | 1/1988 | Needham . |
| 4,783,301 | 11/1988 | Hong . |
| 4,788,232 | 11/1988 | Needham . |
| 4,840,997 | 6/1989 | Snell et al. . |
| 4,873,288 | 10/1989 | Komatsu ................................. 525/194 |
| 4,880,878 | 11/1989 | Himes et al. . |
| 4,894,289 | 1/1990 | Otawa ................................... 428/424.2 |
| 4,897,298 | 1/1990 | Otawa ................................... 428/122 |
| 4,931,324 | 6/1990 | Ellison et al. . |
| 4,946,641 | 8/1990 | Skinner . |
| 5,034,430 | 7/1991 | Babler ..................................... 523/171 |
| 5,035,932 | 7/1991 | Snell et al. . |
| 5,037,475 | 8/1991 | Chida et al. . |
| 5,037,680 | 8/1991 | Papendick et al. . |
| 5,055,346 | 10/1991 | Rohrbacher . |
| 5,153,254 | 10/1992 | Chen . |
| 5,180,629 | 1/1993 | Terada et al. . |
| 5,208,081 | 5/1993 | Gübitz et al. . |
| 5,226,998 | 7/1993 | Few . |
| 5,244,942 | 9/1993 | Hover et al. . |
| 5,250,628 | 10/1993 | Sequela ................................... 525/210 |
| 5,262,468 | 11/1993 | Chen . |
| 5,336,708 | 8/1994 | Chen . |
| 5,342,666 | 8/1994 | Ellison et al. . |
| 5,376,698 | 12/1994 | Sipsas et al. . |
| 5,395,878 | 3/1995 | Sakamoto et al. . |
| 5,401,703 | 3/1995 | Fukuda . |
| 5,441,685 | 8/1995 | Miyakawa ............................... 264/148 |
| 5,508,334 | 4/1996 | Chen . |
| 5,525,675 | 6/1996 | Masuda et al. . |
| 5,574,087 | 11/1996 | Kobayashi et al. . |
| 5,602,203 | 2/1997 | Hamanaka ................................. 525/74 |
| 5,614,584 | 3/1997 | Schwan .................................... 524/591 |
| 5,670,600 | 9/1997 | Nienhaus ................................... 528/75 |
| 5,691,017 | 11/1997 | Inaba ..................................... 428/35.7 |
| 5,716,678 | 2/1998 | Rockrath ............................... 427/407.1 |
| 5,780,125 | 7/1998 | Takeuchi .................................. 428/31 |
| 5,780,541 | 7/1998 | Mayenfels ............................... 524/590 |
| 5,800,912 | 9/1998 | Ogiso et al. . |

FOREIGN PATENT DOCUMENTS

| | | |
|---|---|---|
| 0 321 760 A1 | 6/1989 | European Pat. Off. . |
| 0 472 268 A2 | 2/1992 | European Pat. Off. . |
| 0 472 978 A2 | 3/1992 | European Pat. Off. . |
| 0 548 594 A1 | 6/1993 | European Pat. Off. . |
| 195 40 437 A1 | 5/1996 | Germany . |

OTHER PUBLICATIONS

Patent Abstracts of Japan vol. 015, No. 001 (C–0793), Jan. 7, 1991 (abstract of JP 02 255842 A).

Quantum Corp. Petrothene® Sales Brochure, Resins, Key Properties and Applications.

Mearl Technical Bulletin No. 2, L.M. Greenstein, Nacreous (Pearlescent) Pigments and Interference Pigments, 1988, pp. 1–22.

Mearl Corp. Sales Brochure, Mearl Pearlescent Pigments for Use in Plastics, 1987.

Joseph Prywreller, Will the Big Three Embrace Molded–In Color?, Plastics News at 4 (Jan. 13, 1997).

David Sedgwick, Rugged and Versatile, Plastics Are Turning Up All Over in New Vehicles, Automotive News (Jan. 20, 1997).

*Primary Examiner*—Paul R. Michl
*Attorney, Agent, or Firm*—Harness, Dickey & Pierce, P.L.C.

[57] ABSTRACT

An exterior automotive vehicle component having a pleasing appearance comprises an elastomer modified polyolefin resin matrix having a haze level of less than about 50% and a special effects pigment uniformly distributed therein.

18 Claims, No Drawings

EXTERIOR AUTOMOTIVE COMPONENT OF AN ELASTOMERIC MODIFIED POLYOLEFIN MATERIAL HAVING PLEASING APPEARANCE

FIELD OF THE INVENTION

This invention relates to a material comprising a polyolefin that has been modified with an elastomer, the material having a measured haze of less than about 50% and containing a special effects pigment, such as an aluminum flake pigment or a pearlescent pigment, and preferably a transparent pigment. More specifically, a preferred embodiment of the invention relates to exterior automotive vehicle components made of the material with pigments selected to color match the automotive exterior and to a method of recycling such components.

BACKGROUND OF THE INVENTION

The automotive industry has worked for decades to increase the fuel efficiency of vehicles by, for example, replacing a significant amount of the steel once used to manufacture vehicles by lighter parts made of polymeric resins. At the same time, the industry has moved toward recycling components of vehicles in order to reduce consumption of natural resources. Modern thermoplastics have improved physical properties, such as good tensile strength for a structural component or good impact strength for a bumper, and can be recycled.

While satisfactory functional properties can be achieved with different known thermoplastic materials, there remains a need for thermoplastic materials having an improved appearance. There is a particular need in the automotive market for thermoplastic materials that can be colored to match the appearance of the painted exterior of the vehicle, while maintaining physical properties suited to the particular application. Matching the appearance of the paint has been difficult in view of the extensive automotive color palette, which includes, for example, metallics and other special-effects coatings. In addition, the finish of a vehicle is expected to be of the highest quality in smoothness, glossiness, and depth of image.

In the past, exterior automotive plastic parts have usually been either painted or laminated with a film in order to match the coating on the body of the vehicle. Painting of the plastic parts is problematic for a number of reasons. First, the parts are irregularly shaped, and it is often difficult to apply a smooth film of uniform thickness to all required surfaces. Second, one of the largest sources of regulated emissions in an automotive assembly plant is the paint shop, where the various layers of the finishing materials are applied. In addition, the paint shop is one of the most expensive areas when an automotive plant is constructed due to the need to apply a number of separate layers, with two or more required ovens to cure the various layers, and the emissions control equipment necessary to reduce emissions in the large volumes of waste air that result from spray painting operations. Thus, having a separate painting process requires more manufacturing floor space for the coating line and ovens. Third, the painting process adds to the cost and time of producing the elastomeric parts and articles. Fourth, the paint layer on the article can experience unsightly peeling and other delamination problems while in use, as well as low-temperature cracking due to poorer flexibility of the coating in comparison to the elastomeric article. Finally, it is often difficult to develop good properties in the applied coating because of the limited temperatures available for thermosetting the coating due to the need to avoid deforming the piece.

A number of improved plastics for exterior parts or methods for eliminating the need to paint the exterior parts of vehicles have been proposed. Certain exterior parts may be formed from colored polyvinyl chloride materials. Only certain parts may be made from polyvinyl chloride because of the properties that can be achieved with this material. One limited edition sports car, the DeLorean, was produced with an unpainted metal skin. Using natural metal exterior, however, limits the colors that can be made available.

Duvdevani et al., U.S. Pat. No. 4,268,552, disclose front and rear fascia formed by injection molding an elastomeric-rich inner core of a blend of a neutralized sulfonated elastomer and a polyolefin, and an outer shell or skin of a polyolefin. The Duvdevani reference teaches that the fascia must be painted in order to achieve a desirable finish.

Papendick et al., U.S. Pat. No. 5,037,680, disclose an exterior automotive vehicle component of thermoplastic polyolefin that is pigmented to a color suitable for the vehicle exterior. The component must then be provided with an outer layer of a clear coating in order to achieve the desired gloss, luster, mar resistance, and durability. Moreover, in the case of metallic colors, which dominate the automotive finishing market, the flake pigments must be included in the clear coating layer and cannot be used in the polyolefin composition. Such separation of flake pigments and color pigments may make it difficult to match the look of a painted exterior body, where both flake and color pigments are mixed in the same layer of paint and overcoated with a clear layer of paint. In addition, the clear coated components of the Papendick reference are susceptible to the same problems of delamination, color shifts and appearance changes accompanying delamination or scratching as accompany parts that are painted in the traditional way.

Rohrbacher, U.S. Pat. No. 5,055,346, discloses a process of forming laminate of acrylic thermoplastic paint layers on a flexible thermoformable polymeric material. The laminate and a rigid synthetic resinous substrate are separated formed to desired shapes. Finally, the formed laminate is adhered to the rigid substrate.

Kobayashi et al., U.S. Pat. No. 5,574,087, disclose a molded protective strip molded by gas injection molding from a mixture of one of isotactic propylene homopolymer or propylene bock copolymer with ethylene-propylene copolymer. Colorable compositions are not disclosed.

Terada et al., U.S. Pat. No. 5,574,087, disclose forming large exterior automotive exterior parts from a blend of polypropylene, a vanadium compound-catalyzed ethylene-propylene copolymer rubber, a titanium compound-catalyzed ethylene-propylene copolymer rubber, and a polyethylene. The formed parts must be painted.

Gübitz et al., U.S. Pat. No. 5,208,081, disclose a molding composition comprising isotactic polypropylene or propylene and ethylene copolymers, combined with a rubber-like, polypropylene-compatible copolymer.

Finally, Chrysler Corporation has recently publicly displayed a concept car, the Plymouth Pronto, having body panels made of acrylonitrile-styrene-acrylate thermoplastic with molded-in color. The car is a vanilla straight-shade (i.e., non-metallic). Unlike painted vehicles, for which the finish is smooth and glossy, the concept car has a textured, matte finish.

Thus, it would be desirable to have an article that can be used on the exterior of an automotive vehicle and later removed and recycled for further use. It would further be desirable to provide a material that can be formed processed into colored articles, wherein the color of the material gives the article a pleasing appearance, and preferably may color match an adjacent surface without painting.

We have discovered that an elastomer modified polyolefinic material having high transparency and/or clarity when unpigmented, as measured by light transmission and/or haze, can be pigmented with special effect pigment to produce articles and parts in desired colors with paint quality appearance. In particular, in one embodiment the inventive blend compositions can be pigmented and formed into automotive parts that match the exterior colors of automotive vehicle bodies. The blend compositions may be formulated to provide desirable physical properties, such as excellent flexibility, measured as ease of distortion under an applied load, suitable for bumper fascia.

In a second preferred embodiment, the elastomer modified polyolefinic material is formulated to give the strength and toughness necessary for an automotive body side cladding.

SUMMARY OF THE INVENTION

The invention provides a matrix of a low haze or transparent composition comprising at least one polyolefinic material and at least one thermoplastic elastomer or rubber and a special effect pigment. By low haze, we mean that the haze of a 60-mil plaque of the composition, as measured by ASTM D1003, is less than about 50%. By transparent, we mean a material having a transmission of at least about 80% for a 60-mil plaque, as measured by ASTM D1003. The invention further provides a pigmented composition comprising the transparent, elastomeric blend just described and at least one transparent pigment.

In another embodiment, the invention provides a method of recycling an automotive vehicle component by forming the component, securing it to an exterior of an automotive vehicle, removing the component, grinding and melt forming the component into a desired shape.

The invention further provides for a method of co-extruding a layer of a composition according to the invention and a layer of a second polymeric composition such as a recycled component, and the composite articles formed thereby.

DESCRIPTION OF THE PREFERRED EMBODIMENTS

The material of the invention comprises a low haze or transparent thermoplastic elastomer modified, polyolefinic resin thermoformed into a matrix which has at least one special effect pigment uniformly distributed therein. The material may be formed into an automotive vehicle component such as a body side cladding or molding or bumper fascia.

The polyolefin component of the invention preferably comprises aliphatic polyolefins. In many applications, the articles formed from the present compositions must have excellent outdoor weathering properties. For example, automotive parts formed from the present compositions must meet certain standards for accelerated testing (for example, by Xenon lamp exposure) or field testing at particular locations in Forida or Arizona, as is done for exterior paints. Aliphatic polyolefins are preferably used in order to increase weatherability of the blend compositions and the articles formed therefrom.

The polyolefin component may comprise homopolymers or copolymers of ethylene, propylene, 1-butene, 2-butene, 1-pentene, 1-hexene, 1-octene, butadiene, isoprene, dicyclopentadiene, 1,4-hexadiene, cyclooctadiene, dicyclooctadiene, methylenenorbornene, 5-ethylidene-2-norbornene, 5-vinyl-2-norbornene, 5-methylene-2-norbornene, 5-methyl-1,4-hexadiene, 7-methyl-1,6-octadiene, and the like. Of these, ethylene, propylene, and 1-butene homopolymers and copolymers are preferred. The polyolefin homopolymers or copolymers may include clarified, nucleated, and metallocene-catalyzed polymers.

Metallocene-catalyzed polyolefins are preferred in one embodiment of the invention. Metallocene-catalyzed polyolefins may be characterized as very homogenous polymers with narrow molecular weight distributions. Metallocene-catalyzed polyolefins may have very low densities and excellent optical properties. In particular metallocene-catalyzed linear low density polyethylenes materials of polyethylene homopolymers, or copolymers of ethylene with butene, hexene, octene, or other olefins are characterized by very high dart impact and clarity. These materials need no plasticizer and exhibit high transparency. Syndiotactic polypropylene (s-PP) may be produced at ordinary polymerization temperatures and pressures in high yield with metallocene catalysts. s-PP has low density and high transparency and is suited to use in the compositions of the inventions. Metallocene-catalyzed isotactic polypropylene is a softer and clearer material than the isotactic polypropylene produced with Ziegler-Natta catalysts.

In one preferred embodiment, the polyolefinic material includes low haze or transparent polyethylene, polypropylene, or polybutene. The polybutene may be a liquid or a solid at room temperature, preferably a solid. The block copolymer and the polybutene are apportioned to result in a transparent, elastomeric blend.

The thermoplastic elastomers or rubber may include olefinic elastomers, such as EPM or special clear, transparent, or low haze grades of EPDM rubbers, or block copolymer elastomers, especially block copolymer elastomers having polyolefinic and aromatic vinyl blocks. Among preferred thermoplastic elastomers or rubbers are A-B-A triblock copolymers. Such triblock copolymers are well-known and have been put to many diverse uses. In these triblock elastomers, the middle block is a rubbery material and the rigid endblocks act as thermally reversible physical crosslinks that enable the polymer to be processed as a thermoplastic material while retaining elastic behavior at room temperature. Thermoplastic elastomers offer many advantages over thermoset rubbers. Thermoplastic elastomers can be processed as a melt and, unlike thermoset materials, can be recycled by simply re-melting and re-molding. Among the most versatile of these thermoplastic elastomer materials has been A-B-A block copolymers having as the A blocks polystyrene or another polyvinyl aromatic hydrocarbon and as the B block an elastomer.

As with other elastomers, thermoplastic elastomers are flexible and easily distorted under an applied load. The amount of thermoplastic elastomer that is used to modify the polyolefinic material depends upon the how much flexibility is required in the article to be formed from the inventive material. A greater amount of the thermoplastic elastomers may be used to make, for example, body side moldings, claddings, rocker moldings, bumper fascia, belt line seals, windshield gaskets, backlight gaskets, and sealing systems, than would be required to make other components that are used to provide structural strength, such as door posts or door panels. For seals and other components, the elastomeric properties are necessary in order to function properly.

The present inventions may have a wide range of elastomer content. For articles for which true elastomeric properties are important, such as bumpers, the elastomer may comprise up to 30% by weight of the composition, preferably up to about 15% by weight.

In one preferred embodiment, the thermoplastic elastomer or rubber is an A-B-A block copolymer. The block copolymer preferably has A blocks that are polyvinyl aromatic hydrocarbon and B blocks that are poly(ethylene-butylene). An S-EB-S thermoplastic elastomer is particularly preferred.

Polystyrene-poly(ethylene-butylene)-polystyrene block copolymers are well-known, and are described, for example, in U.S. Pat. Nos. 4,323,534, 4,355,425, and 4,880,878, all of which are incorporated herein by reference. Styrene-poly(ethylene-butylene)-styrene block copolymers are commercially available, for example from Shell Chemical Company, Houston, Tex. under the trade designation KRATON G.

The A-B-A block copolymer may be blended with the low haze or transparent polyolefinic resin. One such polyolefin is liquid polybutene. The ratios of the elastomer or rubber component and the polyolefinic component are determined according to the desired ultimate properties. The blend may contain up to about 92% by weight polylefinic materials and up to about 90% by weight elastomer or rubber. Preferably, the blend contains about 1% to about 70% by weight polylefin homopolymer or copolymer, or mixtures thereof, and materials containing from about 6% to about 35% by weight polyolefinic materials are particularly preferred. When liquid polybutene is employed, the block copolymer and the polyolefin are preferably selected and apportioned so that the blend has a Shore A hardness of at least 50.

In a blend or graft copolymer of the thermoplastic elastomer and the polyolefinic material, it is preferable that the difference in refractive index between the polymers of the blend or graft be as small as possible in order for the composition to be transparent. In addition, both materials must be chosen so that the blend has the haze or transparency characterists required.

In addition to the A-B-A block copolymer and polyolefin, the compositions of the invention may also comprise other low haze or transparent polymers such as acrylic rubbers. When other polymers are added to the blends, they are preferably added in amounts of about 6% to about 10%, by weight.

The compositions of the invention may further comprise various additives known in the art, including plasticizers, UV absorbers, hindered amine light stabilizers, antioxidants, adhesion promoters, foaming agents, and mixtures of these additives. The total amount of additive may be up to 50% by weight of the composition, depending on what additives are used.

Plasticizers may be added in amounts up to 50% by weight of the material of the invention, preferably from about 0.1% to about 50% by weight, and particularly preferably from about 1% to about 10% by weight. Plasticizers that may advantageously be added in the inventive material include, without limitiation, dialkyl esters of diacids, such as dialkyl maleates, dialkyl isophthalates, dialkyl phthalates, dialkyl adipates, dialkyl azalates, and dialkyl sebacates, particular examples of which include dibutyl maleate, dimethyl isophthalate, di-(2-ethylhexyl) phthalate, dibutyl adipate, diisononyl adipate, diisooctyl adipate, polypropylene adipate, di-n-hexyl azelate, dinonyl azalate, dibutyl sebacate, and the like; trialkyl esters of triacids, such as tricapryl citrate; esters of fatty acids, such as n-butyl stearate and octyl tallate; mixed esters; and mixtures of these.

UV absorbers, hindered amine light stabilizers, and antioxidants are usually used in low levels, for example from about 0.025% to about 5% by weight of the composition. Examples of UV absorbers include benzophenones and benzotriazoles, available commercially from a number of sources, including BASF Corp., Mt. Olive, N.J.; CYTEC Industries, West Patterson, N.J.; Ciba-Geigy Corp., Hawthorne, N.Y.; and Witco Corp., Greenwich, Conn. Hindered amine light stabilizers are also available commercially, for example from CYTEC and Ciba-Geigy. Antioxidants include alkylated phenols and bisphenols, alkylidene polyphenols, and other phenolic derivatives; organic phosphites and phosphates; hydroquinone and its derivatives; and various other compounds known to be useful as antioxidants.

Adhesion promoters may be added in amounts of up to 10% by weight, and preferably between about 1% and about 10% by weight, when they are used. Adhesion promoters are preferably added when the inventive compositions are used to make composite articles. Foaming agents are added to compositions to produce foamed articles. Foaming agents may be added in amounts of up to 4% by weight, and preferably between about 0.25% and about 4% by weight.

"Transparent," as used herein, means a material having a transmission of at least 80% for a 60-mil plaque, as measured by ASTM Method D1003. Preferably, the blends have transmission of at least 90% for a 60-mil plaque.

Alternatively, or in addition, the blends have haze of less than 50% for a 60 mil placque, as measured according to ASTM D1003. Preferably, the haze is less than about 30%. It is particularly preferable for the haze of a 60-mil placque of the inventive composition to have a haze of less than about 10%, especially less than about 5% and, in general, compositions preferably have the lowest haze possible. It is also true, however, that thinner articles can have good appearances at higher measured haze values than thicker articles. Low haze or high transparency provides depth of color and gloss in pigmented compositions, as well as metallic and pearlescent brightness and clarity in special effects colors. Automotive articles formed from the colored compositions of the invention are similar to the adjacent painted surfaces of a vehicle, or can replace exterior painted surfaces, even for the highly desirable metallic colors.

As mentioned, it is particularly desirable to add various substantially transparent pigments and colorants to the compositions of the invention. Because of the high transparency and low haze of the polymer blends of the invention, the pigmented compositions formed from the polymer blends have a depth of color and high gloss that closely matches coatings. In particular, these compositions allow the formulator to produce the metallic and pearlescent effects necessary to closely match the coatings on automotive bodies.

Pigments may be added in amounts of up to about 10% by weight preferably between about 4% and about 6% by weight. Enough pigment is added to achieve the desired color and opacity. The pigment is preferably first dispersed in a suitable carrier, such as a low molecular weight polyethylene or polypropylene material, before being introduced into the inventive blends. While the pigment loading may be higher than 10%, the skilled artisan will appreciate that there is point at which the physical properties of the polymer blends will be adversely affected by higher pigment loadings.

There are many pigments known in the art, and in principle, any of these may be used. The pigments used may be inorganic or organic pigments. In particular, special effects pigment including flake pigments may be used to achieve special effects, such as a metallic appearance, alone or in conjunction with color pigments. Inorganic pigments include, for example, metal oxides and chromates. Particular examples of pigments that may be advantageously employed are titanium dioxide, carbon black, ocher, sienna, umber, hematite, limonite, red iron oxide, transparent red iron oxide, black iron oxide, brown iron oxide, chromium oxide green, strontium chromate, ferric ferrocyanide (Prussian blue), ultramarine blue, and lead chromate. Particular examples of useful organic pigments are metallized and non-metallized azo reds, quinacridone reds and violets, anthraquinone reds, perylene reds, copper phthalocyanine blues and greens, ohthalocyanine blacks, isoindolinone oranges and yellows, carbazole violet, monoarylide and diarylide yellows, benzimidazolone yellows and oranges, tolyl orange, naphthol orange, and so on. Inorganic and organic pigments are available from many sources, including BASF Corporation, Mt. Olive, N.J.; Cabot Corporation, Billerica, Mass.; Ciba-Geigy Corp., Newport, Del.; Colombian Chemicals, Co., Atlanta, Ga.; Cookson Pigments, Inc., Newark, N.J.; Degussa Corp., Ridgefield Park, N.J.; Sandoz Chemicals Corp., Charlotte, N.C.; and Mineral Pigments Corp., Beltsville, Md..

Examples of special effect flake pigments are metallic flake and pearlescent pigments, including, without limitation, aluminums, micas, gold bronze (copper-zinc alloys), copper, nickel, brass, magnesium, zinc, and alloys of these. Flake pigments are usually available in fine, medium, and coarse grades. Aluminums and pearlescent micas are particularly preferred. Commercial aluminum flake pigments are available from many sources, including Silberline, Tamaqua, Penna.; EM Industries, Hawthorne, N.Y.; Aluminum Company of America, Pittsburgh, Penna., Obron Atlantic Corp., Painesville, Ohio; Reynolds Metals Company, Richmond, Va.; and Toyo Aluminum KK, Higashiku, Osaka, Japan. Micas are commercially available from The Mearl Corporation, New York, N.Y. and EM Industries, Hawthorne, N.Y.

The special effect flake pigments, and substantially transparent color pigments, if used, may be surface treated, modified, or predispersed separately or together prior to blending with the polymer composition of the invention. In some cases, the flake pigments may be simply stirred into the melted compositions during extrusion. When the pigments are pre-dispersed, they may be prepared as color concentrates according to methods known in the art. The amount of pigment and polymer vary according to the pigment used and is readily determined by one skilled in the art to optimize dispersion characteristics or properties of the pigment concentrate. Flake pigments should be processed in a way that avoids bending or breaking the flakes. Other pigments, such as the color pigments mentioned, are preferably pre-dispersed or pretreated. During the pigment dispersion process, pigment agglomerates in the powder pigments are broken down and the pigment may be ground to a predetermined fine size to allow for optimum color development at minimum pigment loadings. The average particle size of the dispersed pigment, excluding flake pigments, is preferably less than about one micron, and particularly preferably less than about 0.2 micron. It is likewise important that the pigment be wet out by the dispersing medium or by the compositions of the invention in order to attain optimum color development. The prepared pigment paste or concentrate may then be introduced into the inventive composition during the blending step. The special effects pigments and/or the color pigments, including especially transparent pigments, are uniformly distributed in the elastomer modified polyolefin resin matrix. By "uniformly distributed" we mean that the article when viewed by the naked eye appears to have a reasonably uniform color and/or metallic appearance suitable for the intended use of the article.

Dyes may be used instead of or in addition to pigments. Examples of suitable dyes include azo dyes, azo metal complexes, anthraquinone dyes, and naphthazines.

All of the aforementioned materials may be blended together during a blending step, then the blended composition may be thermoformed into the desired articles. The blending step may be carried out at any convenient temperatures using methods commonly employed in the art. The blending may be done using methods and equipment known in the art, such as a Banbury mixer, a kneader, a monoaxial or biaxial extruder, and so on. It is also possible for the blending, in whole or in part, to take place in the equipment used to form the final article, for example in the chamber of a twin screw extruder.

Various known methods of forming thermoplastic materials may be employed to form articles from the compositions of the invention. Examples of suitable processes include, without limitation, compression molding, extrusion, thermoforming, and injection molding. The present compositions are formulated to have a melt flow appropriate for the molding or forming equipment used. A wide range of melt flow values is possible, for example from about 0.4 to about 35 g/10 min., as measured according to ISO 1133.

It is also possible to co-extrude parts with an outer layer of the composition of the invention and an inner, substrate layer from another thermoplastic material. In the case of coextruded parts, the compositions may further include one or more adhesion promoters. Useful adhesion promoters include acid-modified polyolefinic materials. In a preferred process, the outer skin formed from the inventive composition is pigmented and laminated onto a body side molding. The lamination process may be accomplished in more than one way. In one preferred embodiment, the outer skin is laminated onto the substrate, particularly onto a body side molding, during the extrusion process by introducing the inventive composition into the extruder and subsequently co-extruding the outer skin and the substrate. In another preferred embodiment, the outer skin and substrate are separately extruded and then the laminate is formed according to the usual methods, for example, by sandwiching an adhesion promoter layer or adhesive between the film and substrate and then applying pressure and heat to bond the layers.

Various articles may be formed by the processes of the invention. In particularly preferred embodiments, the processes are used to form automotive exterior body parts and molding, such as seals, trim strips, body side moldings, claddings, fascias, ground effects parts including spoiler, air dams, door handles, mirror housings, and so on. It is especially desirable to form full or partial body panels, doors, and front and rear deck lids from the present compositions. It is also desirable to form window parts, such as window framing, sealing, sill plates, and trim from these compositions. Because of the low haze and/or high transparity or clarity of the present polymer compositions, the pigmented compositions offer a high gloss finish with extremely attractive depth of image which may be combined with selected special effect pigments such as aluminum and pearlescent pigments to produce the bright metallic effects and sparkling colors that are widely used in automobile finishes.

In addition to the automotive applications for exterior body colors, the present compositions may be used to form other exterior or interior automotive parts or articles, such as lenses, including taillight, headlight, and turn signal covers; interior door panels; interior window framing, sealing and trim; seal panels; greenhouse decks; insturment panel covers; and interior door handles. Non-automotive applications are also contemplated, including appliance wall panels, both interior and exterior, for appliances including refrigerators and freezers; handles for appliances, equipment, or other articles; trays for refrigerators, freezers, or other articles; and storage boxes or shelves.

The relatively low densities of the present compositions make them especially desirable for applications in which strength, impact, or other properties must be attained while minimizing weight of the article. Weight of materials has long been a consideration in producing automotive vehicles because added weight reduces fuel mileage. The present compositions and materials have the advantage of being up to about 30% lighter than PVC, which has been used for various automotive applications in the past.

With respect to other properties, the present elastomer modified polyolefin compositions can be formulated to achieve flex modulus values in accordance with ISO 178 in the range of from about 100 to about 700 MPa; impact strenth in accordance with ISO 180/A of 15 KJ/m$^2$ to no break at or above 0° C., and between about 1.5 to 40 KJ/m$^2$ at −40° C.; and a heat resistance showing no substantial deleterious changes in the material after 25 minutes at 130° C.

The exterior automotive vehicle components formed according to the invention may be secured to an automotive vehicle so that a painted surface is adjacent to the component. The appearance of the component preferably substantially color matches the painted surface of the vehicle. In particular, the exterior automotive vehicle component may be a body side cladding or a bumper fascia.

Automotive vehicle components prepared according to the invention are particularly suited to recycling processes due to the compatibility of the polyolefin resin matrix with other thermoplastic materials, especially those that are typically employed in automotive applications. When the inventive component is recycled, typically the component is removed from the vehicle and reduced to a particular material before forming the material into a new shape. The component may be ground to the particulate material using known methods. As already mentioned, the polyolefin resin matrix of the invention is compatible with other thermoplastic materials and may be blended with such materials during the recycling process.

The invention is illustrated by the following non-limiting examples. All parts are parts by weight unless otherwise noted.

EXAMPLES

Example 1

Preparation of Silver Metallic Material

The following materials are weighed into a Banbury mixer: 67.71 parts by weight Quantum PP 7352 (a polypropylene copolymer available from Quantum Chemical Corp., Chicago, Ill.); 16.93 parts by weight Exxon Achieve™ 3825 (a metallocene-catalyzed polypropylene available from Exxon); 6.77 parts by weight Kraton™ 1652 (a thermoplastic elastomer available from Shell Chemical Company, Houston, Tex.); 6.77 parts by weight dioctyl adipate; 1.02 parts by weight Cynasorb™ UV 5411 (available from CYTEC Industries, West Patterson, N.J.); 0.34 parts by weight Cynasorb™ UV 3581 (available from CYTEC Industries, West Patterson, N.J.); 0.7 parts by weight Antioxidant 2777 (available from CYTEC Industries, West Patterson, N.J.); 0.195 parts by weight Myverol™ 1806 (a mold release agent available from Eastman Chemical Co., Kingsport, Tenn.); and 0.195 parts by weight Myverol™ 1892 (an antistat agent available from Eastman Chemical Co., Kingsport, Tenn.). The ingredients are mixed for about three minutes at high shear to form a matrix.

When the drop temperature of the batch reaches about 290° F., the batch is dropped into a twin-screw extruder. Aluminum flake pigment (available commercially from Silberline, Tamaqua, Penna.) and white mica flake (from EM Industries) is metered into the front end of the extruder in a ratio of 2 parts aluminum and 2 parts of mica per 100 parts of matrix. The mixture is extruded and then pelletized underwater using an underwater pelletizer. The pellets are suitable for extrusion or the conventional forming process using heat into automotive vehicle components or other articles.

Example 2

Preparation of Silver Frost Bumper Fascia

The following materials are weighed into a Banbury mixer: 71.0 parts by weight Accpro™9433 (available from Amoco), 15.0 parts by weight Kraton 1652, 11.0 parts by weight of dioctyl adipate; 1.5 parts by weight of Cynasorb™ UV 5411; 0.4 parts by weight of Cynasorb™ UV 3581; 0.1 part by weight of Antioxidant 2777; 0.5 part by weight of Myverol 1806; and 0.5 part by weight of Myverol 1892. The ingredients are mixed for about three minutes at high shear to form a matrix.

Color concentrates of the following formulas are formed in a two-roll mill. For each pigment, the indicated parts by weight of Engage (available from DuPont-Dow Elastomers Co.) is melted, then the pigment is added, then the materials are mixed until homogeneous, and finally the mixture is pelletized using an underwater pelletizer. A medium-flake silver concentrate is prepared from 23 parts by weight of medium flake aluminum pigment (available from Silberline) and 77 parts by weight Engage. A white pearlescent concentrate is prepared from 32 parts by weight White Pearl 151 mica flake (available from EM Industries) and 68 parts by weight Engage. A fine-flake silver concentrate is prepared from 23 parts by weight of fine flake aluminum pigment (available from Silberline) and 77 parts by weight Engage. A russet pearlescent concentrate is prepared from 32 parts by weight Russet Pearl 449X mica flake (available from Mearl) and 68 parts by weight Engage. A white concentrate is prepared from 70 parts by weight R960 titanium dioxide (available from DuPont) and 30 parts by weight Engage.

To prepare the bumper fascia, 100 parts by weight of the matrix and the following amounts of the color concentrates are dry mixed: 5 parts by weight of the medium-flake silver concentrate, 4 parts by weight of the white pearlescent concentrate, 1 part by weight of the fine-flake silver concentrate, 0.15 part by weight of the white concentrate, and 0.08 part by weight of the russet pearlescent concentrate. The dry mix is fed into a twin-screw extruder and extruded into the shape of a bumper fascia.

What is claimed is:

1. An exterior automotive vehicle component comprising an elastomer modified polyolefin resin matrix having a haze level of less than about 50% and having a special effects pigment selected from the group consisting of metallic flake pigments, pearlescent pigments, and combinations thereof uniformly distributed therein, wherein said exterior automotive vehicle component has a pleasing appearance.

2. The exterior automotive vehicle component of claim 1 wherein said matrix comprises a blend of an aliphatic polyolefinic resin and a thermoplastic elastomer.

3. The exterior automotive vehicle component of claim 2 wherein said matrix further comprises a substantially transparent pigment uniformly distributed therein.

4. The exterior automotive vehicle component of claim 1 wherein said component is secured to an automotive vehicle having a painted surface adjacent to said component and said appearance of said component substantially color matches said painted surface.

5. The exterior automotive vehicle component of claim 1 wherein said matrix forms an outer surface of said component.

6. The exterior automotive vehicle component of claim 1 wherein said polyolefin resin comprises polypropylene.

7. The exterior automotive vehicle component of claim 1 wherein said special effects pigment is a metallic flake pigment.

8. The exterior automotive vehicle component of claim 1 wherein said special effects pigment is a pearlescent pigment.

9. The exterior automotive vehicle component of claim 1 wherein said component is a body side cladding.

10. The exterior automotive vehicle component of claim 1 wherein said component is a bumper fascia.

11. A method of providing a component for an automotive vehicle comprising the steps of:
   (a) blending a substantially transparent polyolefin resin and a substantially transparent thermoplastic elastomer to make a matrix, said matrix having a haze level of less than about 50%;
   (b) uniformly distributing a special effects pigment selected from the group consisting of metallic flake pigments, pearlescent pigments, and combinations thereof in said matrix;
   (c) uniformly distributing substantially transparent pigment in said matrix;
   (d) thermoforming said matrix into a component having a selected shape;
   (e) securing said component to an exterior surface of said vehicle, said exterior surface of said vehicle having a color and said pigment being selected to substantially match said color.

12. The method of the present invention in accordance with claim 11 wherein said matrix comprises a blend of an aliphatic polyolefinic resin and a thermoplastic elastomer.

13. The method of the present invention in accordance with claim 12 wherein said polyolefin resin is polypropylene.

14. The method of the present invention in accordance with claim 13 wherein said special effects pigment is a metallic flake pigment.

15. The method of the present invention in accordance with claim 13 wherein said special effects pigment is a pearlescent pigment.

16. The method in accordance with claim 11 wherein said component is a body side cladding.

17. The method of in accordance with claim 11 wherein said component is a bumper fascia.

18. A method of recycling an automotive vehicle component comprising the steps of:
   (a) securing an automotive vehicle component to an exterior surface of an automotive vehicle, said component comprising a matrix of a substantially transparent polyolefin resin and a substantially transparent thermoplastic elastomer, said matrix having a haze level of less than about 50%, said matrix having a special effects pigment selected from the group consisting of metallic flake pigments, pearlescent pigments, and combinations thereof uniformly distributed therein;
   (b) removing said component from said exterior surface of said automotive vehicle;
   (c) reducing said component to form a particulate material;
   (d) forming said particulate material into a desired shape.

* * * * *